United States Patent
Zhou et al.

(10) Patent No.: US 12,000,944 B2
(45) Date of Patent: Jun. 4, 2024

(54) POSITIONING SYSTEM WITH NLOS IDENTIFICATION AND MULTIPATH MITIGATION

(71) Applicant: Samsung Electronics Co., Ltd., Suwon-si (KR)

(72) Inventors: Yuhan Zhou, San Diego, CA (US); Jung Hyun Bae, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 317 days.

(21) Appl. No.: 17/482,255

(22) Filed: Sep. 22, 2021

(65) Prior Publication Data

US 2022/0113364 A1    Apr. 14, 2022

Related U.S. Application Data

(60) Provisional application No. 63/134,421, filed on Jan. 6, 2021, provisional application No. 63/091,153, filed on Oct. 13, 2020.

(51) Int. Cl.
*G01S 5/02* (2010.01)
*G01S 5/00* (2006.01)
*H04W 64/00* (2009.01)

(52) U.S. Cl.
CPC ............. *G01S 5/0218* (2020.05); *G01S 5/011* (2020.05); *H04W 64/006* (2013.01)

(58) Field of Classification Search
CPC .......... G01S 5/0218; G01S 5/011; G01S 5/06; G01S 5/0036; G01S 5/0205;
(Continued)

(56) References Cited

U.S. PATENT DOCUMENTS 9,888,348 B2    2/2018   Xiao et al.
10,101,434 B2   10/2018  Xiao et al.
(Continued)

FOREIGN PATENT DOCUMENTS

WO    WO 2020/068295 A1    4/2020
WO    WO 2020/206021 A1    10/2020

OTHER PUBLICATIONS

EPO Extended European Search Report dated Mar. 9, 2022, issued in corresponding European Patent Application No. 21201826.1. (6 pages).

*Primary Examiner* — Siu M Lee
(74) *Attorney, Agent, or Firm* — Lewis Roca Rothgerber Christie LLP (57) ABSTRACT

A system and method for positioning for line-of-sight and non-line-of sight environments. In some embodiments, the method includes: receiving, by a User Equipment (UE), from a first Transmission and Reception Point (TRP) of a network, a Positioning Reference Signal (PRS); and sending, by the UE, a response to the network. The sending may include sending an indicator, the indicator indicating whether the UE has performed a measurement based on the Positioning Reference Signal, received via a line-of-sight path; or the sending may include identifying a first detected path and sending a plurality of measurements to the network, the plurality of measurements including, for each of a first plurality of paths, the arrival time difference relative to the arrival time of the first detected path, the first plurality of paths not including the first detected path, and the first plurality of paths including two paths.

19 Claims, 6 Drawing Sheets

(58) Field of Classification Search
CPC .. G01S 5/0273; G01S 5/0009; H04W 64/006; H04W 64/00; H04W 56/0065; H04W 56/0095; H04B 17/24; H04B 17/318; H04B 17/364
See application file for complete search history.

(56) References Cited

U.S. PATENT DOCUMENTS

| | | | |
|---|---|---|---|
| 2014/0192672 A1* | 7/2014 | Seo | H04L 5/0023 370/252 |
| 2019/0373575 A1* | 12/2019 | Kurras | G01S 5/0221 |
| 2020/0059888 A1 | 2/2020 | Cui et al. | |
| 2020/0220612 A1* | 7/2020 | Thomas | H04B 17/345 |
| 2020/0236507 A1 | 7/2020 | Manolakos et al. | |
| 2020/0260220 A1 | 8/2020 | Xiao et al. | |
| 2021/0099832 A1 | 4/2021 | Duan et al. | |
| 2021/0185632 A1* | 6/2021 | Manolakos | H04L 5/0094 |
| 2021/0239783 A1* | 8/2021 | Calcev | G01S 11/08 |
| 2022/0159415 A1* | 5/2022 | Khoryaev | H04L 27/261 |
| 2023/0056394 A1* | 2/2023 | Priyanto | G01S 5/0218 |
| 2023/0204705 A1* | 6/2023 | Thomas | H04L 5/0048 342/450 |

* cited by examiner

```
NR-Multi-RTT-MeasElement-r16 ::= SEQUENCE {
    dl-PRS-ID-r16                      INTEGER (0..255),
    nr-PhysCellID-r16                  NR-PhysCellID-r16           OPTIONAL,
    nr-CellGlobalID-r16                NCGI-r15                    OPTIONAL,
    nr-ARFCN-r16                       ARFCN-ValueNR-r15           OPTIONAL,
    nr-DL-PRS-ResourceID-r16           NR-DL-PRS-ResourceID-r16    OPTIONAL,
    nr-DL-PRS-ResourceSetID-r16        NR-DL-PRS-ResourceSetID-r16 OPTIONAL,
    nr-UE-RxTxTimeDiff-r16             CHOICE {
        k0-r16                             INTEGER (0..1970049),
        k1-r16                             INTEGER (0..985025),
        k2-r16                             INTEGER (0..492513),
        k3-r16                             INTEGER (0..246257),
        k4-r16                             INTEGER (0..123129),
        k5-r16                             INTEGER (0..61565),
        ...
    },
    nr-AdditionalPathList-r16          NR-AdditionalPathList-r16   OPTIONAL,
    nr-TimeStamp-r16                   NR-TimeStamp-r16,
    nr-TimingQuality-r16               NR-TimingQuality-r16,
    nr-DL-PRS-RSRP-Result-r16          INTEGER (0..126)            OPTIONAL,
    nr-Multi-RTT-AdditionalMeasurements-r16
                                       NR-Multi-RTT-AdditionalMeasurements-r16  OPTIONAL,
    NLosIndicator                      ENUMERATED {0,dot1, dot2,..., dot9, 1}   OPTIONAL,
    ...
```

Receive, by a User Equipment (UE), from a first Transmission and Reception Point (TRP) of a network, a first Positioning Reference Signal (PRS)
605

Send, by the UE, to the network, an indicator, the indicator indicating whether the UE received the first Positioning Reference Signal via a line-of-sight path.
610

FIG. 6

POSITIONING SYSTEM WITH NLOS IDENTIFICATION AND MULTIPATH MITIGATION

CROSS-REFERENCE TO RELATED APPLICATION(S)

The present application claims priority to and the benefit of (i) U.S. Provisional Application No. 63/091,153, filed Oct. 13, 2020, entitled "NR POSITIONING WITH NLOS LINK IDENTIFICATION", and (ii) U.S. Provisional Application No. 63/134,421, filed Jan. 6, 2021, entitled "NR POSITIONING WITH NLOS LINK IDENTIFICATION", the entire contents of both of which are incorporated herein by reference.

FIELD

One or more aspects of embodiments according to the present disclosure relate to positioning in a mobile communications network, and more particularly to a system and method for positioning capable of adapting to line-of-sight and non-line-of sight environments.

BACKGROUND

In a mobile communications network, positioning accuracy may be significantly degraded due to the impact of the multipath caused by non-line-of-sight signals. This may be especially true for indoor internet of things (IIoT) scenarios.

Thus, there is a need for a system and method for positioning capable of adapting to line-of-sight and non-line-of sight environments.

SUMMARY

According to an embodiment of the present disclosure, there is provided a method, including: receiving, by a User Equipment (UE), from a first Transmission and Reception Point (TRP) of a network, a Positioning Reference Signal (PRS); and sending, by the UE, a response to the network, wherein: the sending of the response includes sending, by the UE, to the network, an indicator, the indicator indicating whether the UE has performed a measurement based on the Positioning Reference Signal, received via a line-of-sight path; or the sending of the response includes identifying, by the UE, a first detected path and sending, by the UE, a plurality of measurements to the network, the plurality of measurements including, for each of a first plurality of paths, the arrival time difference relative to the arrival time of the first detected path, the first plurality of paths not including the first detected path, and the first plurality of paths including two paths.

In some embodiments, the sending of the response includes sending, by the UE, to the network, an indicator, the indicator indicating whether the UE has performed a measurement based on the Positioning Reference Signal, received via a line-of-sight path.

In some embodiments, the indicator is a binary value.

In some embodiments, the indicator is a value selected from a set of three or more finite precision values in the interval [0, 1].

In some embodiments, the indicator is an estimate of the likelihood that the UE has performed a measurement based on the Positioning Reference Signal, received via a line-of-sight path.

In some embodiments, the method further includes: calculating, by the UE, a Power Delay Profile (PDP) or Channel Impulse Response (CIR) corresponding to the Positioning Reference Signal; and generating, by the UE, the indicator, based on the Power Delay Profile or Channel Impulse Response.

In some embodiments, the sending of the indicator includes sending the indicator in SignalMeasurementInformation information element (IE) for PRS-RSRP, RSTD, and Rx-Tx time difference measurements.

In some embodiments, the sending of the response includes identifying, by the UE, a first detected path and sending, by the UE, a plurality of measurements to the network, the plurality of measurements including, for each of a first plurality of paths, the arrival time difference relative to the arrival time of the first detected path, the first plurality of paths not including the first detected path, and the first plurality of paths including two paths.

In some embodiments, the first plurality of paths includes three paths.

In some embodiments, the plurality of measurements further includes, for each path of the first plurality of paths, the received power for the path.

In some embodiments, for each path of the first plurality of paths, the received power for the path is a measurement of power for the path relative to a measurement of power for the first detected path.

In some embodiments, for each path of the first plurality of paths, the received power for the path is a measurement of power for the path relative to a measurement of total power across all paths.

According to an embodiment of the present disclosure, there is provided a system, including: a User Equipment (UE) including a processing circuit, the processing circuit being configured to: receive, from a first Transmission and Reception Point (TRP) of a network, a Positioning Reference Signal (PRS); and send a response to the network, wherein: the sending of the response includes sending, by the UE, to the network, an indicator, the indicator indicating whether the UE has performed a measurement based on the Positioning Reference Signal, received via a line-of-sight path; or the sending of the response includes identifying, by the UE, a first detected path and sending, by the UE, a plurality of measurements to the network, the plurality of measurements including, for each of a first plurality of paths, the arrival time difference relative to the arrival time of the first detected path, the first plurality of paths not including the first detected path, and the first plurality of paths including two paths.

In some embodiments, the sending of the response includes sending, by the UE, to the network, an indicator, the indicator indicating whether the UE has performed a measurement based on the Positioning Reference Signal, received via a line-of-sight path.

In some embodiments, the indicator is a binary value.

In some embodiments, the indicator is a value selected from a set of three or more finite precision values in the interval [0, 1].

In some embodiments, the indicator is an estimate of the likelihood that the UE has performed a measurement based on the Positioning Reference Signal, received via a line-of-sight path.

In some embodiments, the processing circuit is further configured to: calculate a Power Delay Profile (PDP) or Channel Impulse Response (CIR) corresponding to the Positioning Reference Signal; and generate the indicator, based on the Power Delay Profile or Channel Impulse Response.

In some embodiments, the sending of the indicator includes sending the indicator in SignalMeasurementInformation information element (IE) for PRS-RSRP, RSTD, and Rx-Tx time difference measurements.

According to an embodiment of the present disclosure, there is provided a system, including: a User Equipment (UE) including means for processing, the means for processing being configured to: receive, from a first Transmission and Reception Point (TRP) of a network, a Positioning Reference Signal (PRS); and send a response to the network, wherein: the sending of the response includes sending, by the UE, to the network, an indicator, the indicator indicating whether the UE has performed a measurement based on the Positioning Reference Signal, received via a line-of-sight path; or the sending of the response includes identifying, by the UE, a first detected path and sending, by the UE, a plurality of measurements to the network, the plurality of measurements including, for each of a first plurality of paths, the arrival time difference relative to the arrival time of the first detected path, the first plurality of paths not including the first detected path, and the first plurality of paths including two paths.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for positioning capable of adapting to line-of-sight and non-line-of sight environments provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
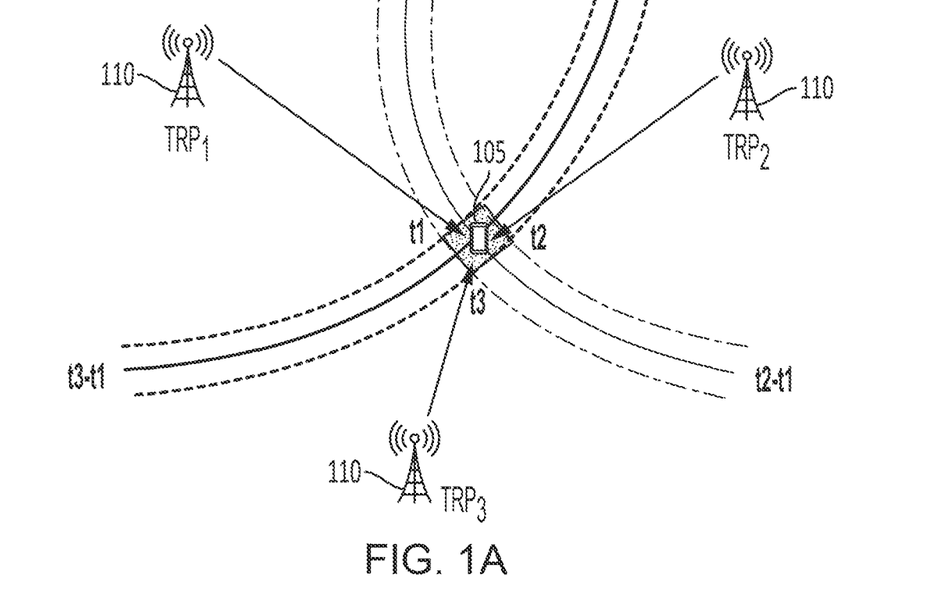
FIG. 1A is a schematic drawing of a method for positioning, according to an embodiment of the present disclosure.
Figure 1B:
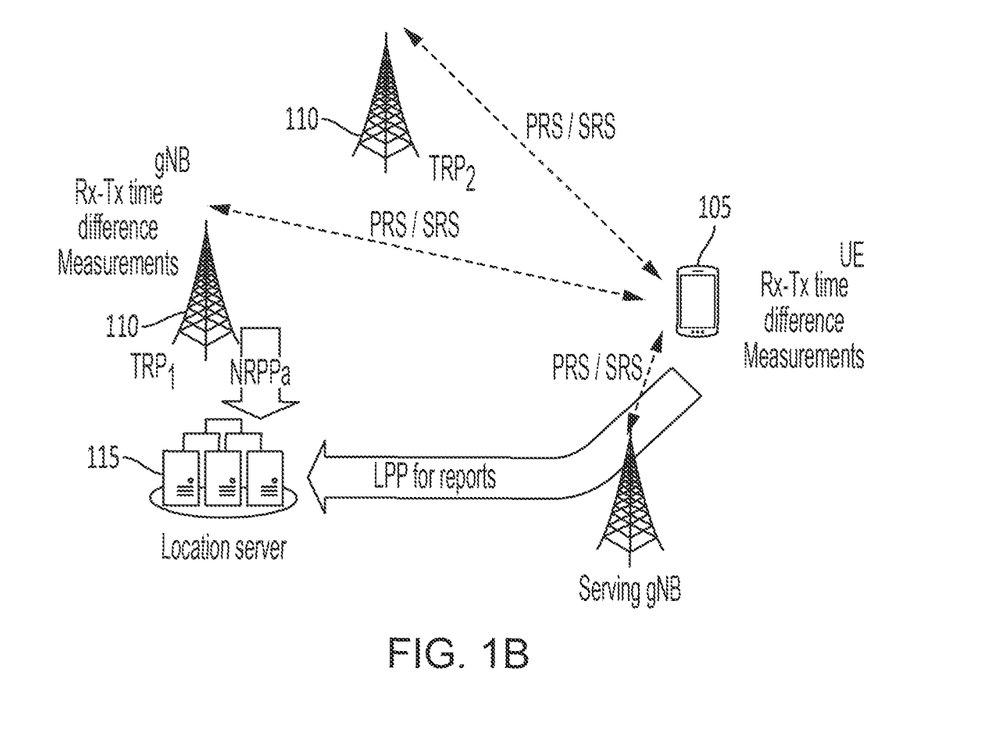
FIG. 1B is a schematic drawing of a method for positioning, according to an embodiment of the present disclosure.

Various methods may be used to perform positioning of a User Equipment (UE) 105, e.g., a mobile telephone, in a mobile communications system (e.g., in a 5G New Radio (NR) system). Any such method may be in one of three categories: (i) downlink positioning methods (methods using one or more downlink transmissions, such as downlink Time Difference of Arrival (DL-TDOA) and Downlink Angle of Departure (DL-AoD)), (ii) uplink positioning methods (methods using one or more uplink transmissions, such as uplink Time Difference of Arrival (DL-TDOA) and Uplink Angle of Arrival (DL-AoA)), and (iii) downlink plus uplink (DL+UL) positioning methods (methods using one or more downlink transmissions and one or more uplink transmissions, such as multi round trip time (multi-RTT)). For example, referring to FIG. 1A, in a method using a Downlink Time Difference of Arrival (DL-TDOA), the UE measures the Reference Signal Time Difference (RSTD) between the serving Transmission and Reception Point (TRP) and a reference TRP and reports it to the Location Management Function (LMF). From two such RSTDs (e.g., (i) the RSTD t2–t1 between a second TRP and a first TRP and (ii) the RSTD t3–t1 between a third TRP and the first TRP), the LMF may be able to infer the position of the UE 105. Referring to FIG. 1B, in a method using receive-transmit (Rx-Tx) time differences, the TRPs may send Positioning Reference Signals (PRSs) to the UE 105, and the UE 105 may send, to the TRPs 110 (i) Sounding Reference Signals (SRSs) to the TRPs 110 and (ii) receive-transmit (Rx-Tx) time differences (each of which may be the time difference between receipt, at the UE, of a PRS, and transmission, by the UE, of an SRS). From (i) the transmission times of the PRSs, (ii) measurements of the arrival times of the SRSs and (iii) the reported Rx-Tx time differences, the network may calculate the round-trip time to the UE from each of the TRPs 110, and from these round trip times, the LMF may calculate the position of the UE. The data may be sent to the location server 115 using Long Term Evolution (LTE) Positioning Protocol (LPP) or New Radio Positioning Protocol a (NRPPa).

Figure 2A:
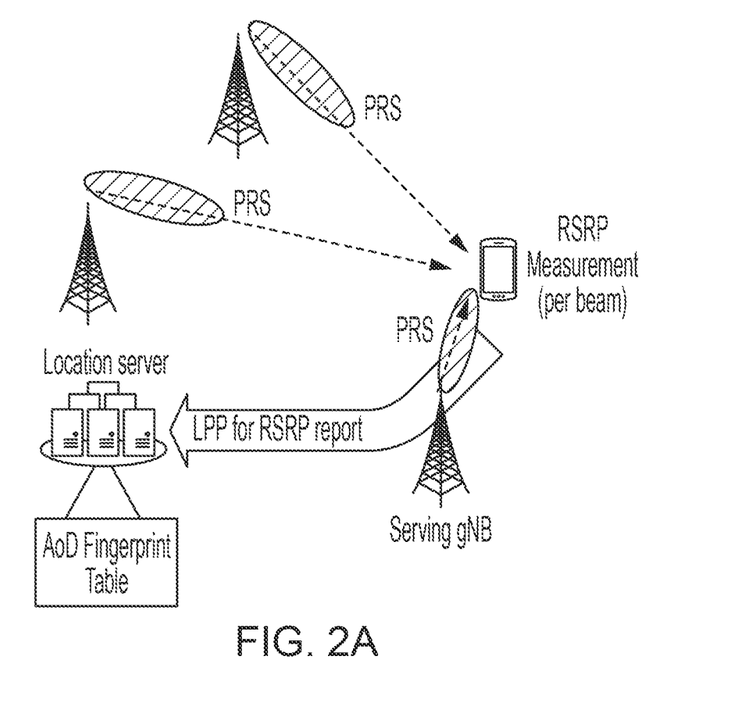
FIG. 2A is a schematic drawing of a method for positioning, according to an embodiment of the present disclosure.
Figure 2B:
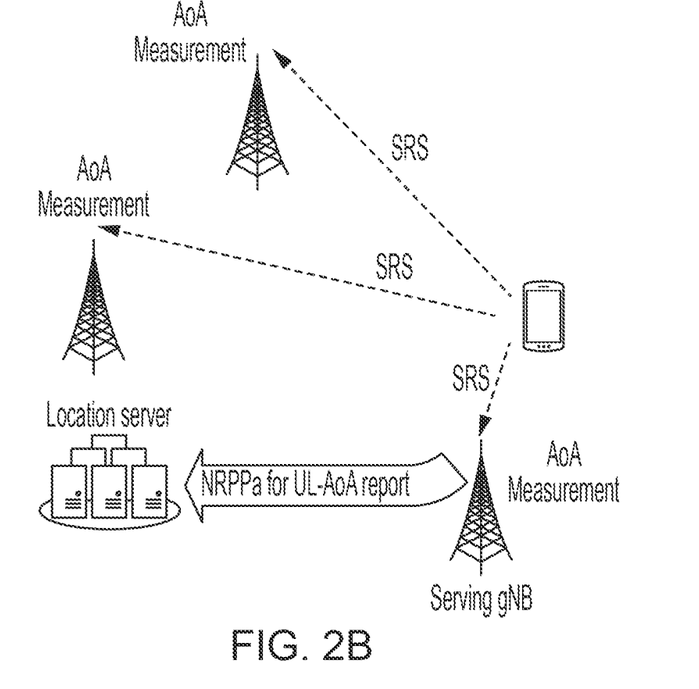
FIG. 2B is a schematic drawing of a method for positioning, according to an embodiment of the present disclosure.

FIG. 2A illustrates a Downlink Angle of Departure (DL-AoD) positioning method, in which each of several TRPs 110 transmits multiple PRS signals using different transmit (Tx) beams each having a different beam direction. The UE measures the Reference Signal Received Power (RSRP) of the downlink PRS per Tx beam and reports it to the LMF, which infers the position of the UE. FIG. 2B shows an analogous Uplink Angle of Arrival (UL-AoA) positioning method in which each of several TRPs 110 measures the angle of arrival of the uplink Sounding Reference Signal (SRS) and reports it to the LMF, which infers the position of the UE.

In timing-based positioning methods, a random bias due to non-line-of-sight (NLOS) conditions may degrade the performance of position estimation. For example, in the Indoor Factory (InF) models defined in Technical Specification (TS) 38.901 of the 3rd Generation Partnership Project (3GPP) the mean NLOS excess delay is 48.3 ns, corresponding to 14.5 m. NLOS conditions may similarly degrade the performance of angle-based positioning methods, such as the Downlink Angle of Departure (DL-AoD) and Uplink Angle of Arrival (UL-AoA) positioning methods. With a stringent requirement of 20 cm on positioning accuracy for Indoor Internet of Things (IIoT) scenarios in a 3GPP Study Item (SID), 3GPP document RP-202094, NLOS detection may be important in meeting the requirements.

Figure 3:
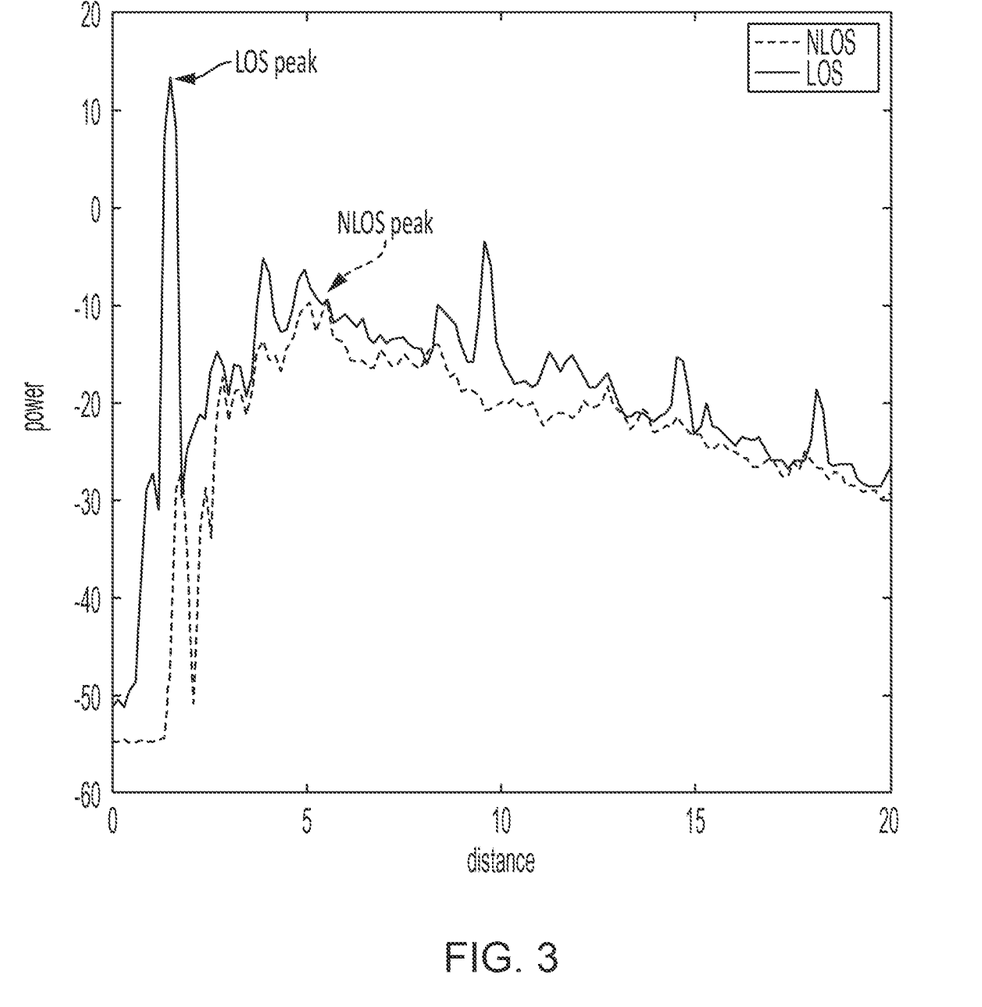
FIG. 3 is a graph of Power Delay Profiles, according to an embodiment of the present disclosure.

FIG. 3 shows a Power Delay Profile (PDP) for a line-of-sight (LOS) scenario and a Power Delay Profile for a NLOS scenario (e.g., an indoor factory scenario). It may be seen from FIG. 3 that in the LOS scenario the highest peak of the measurement is very prominent. It is the first very clear peak arising from the measurement noise floor. By contrast, in the NLOS case, the highest peak of the measurement data is very gradual. The nature of the LOS peak can be attributed to the fact that in LOS conditions, all scattered signals arrive after the LOS component of the delay profile. Magnitudes of arriving scattered signals may generally be lower than the LOS reception due to higher path losses and other loss attributing effects. In NLOS cases, the highest peak may arrive after many other scattering peaks. Even when the NLOS peak is prominent, it may be received after diffuse scattering components. Receiving diffuse scattering components along and before the prominent NLOS peak makes the rise of the peak gradual, as may be seen in FIG. 3.

Figure 4A:
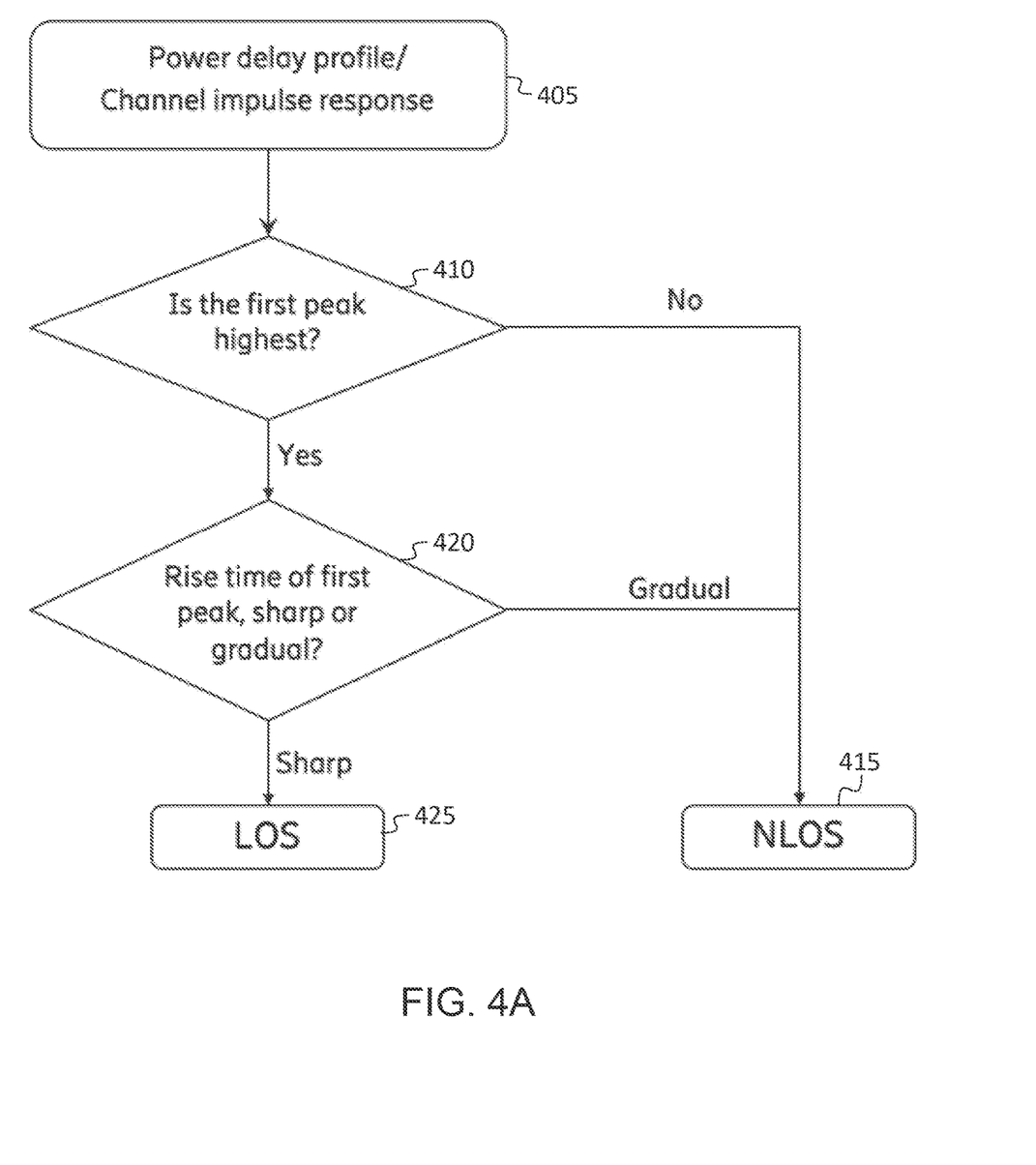
FIG. 4A is a flowchart of a method, according to an embodiment of the present disclosure.

As such, a method such as that illustrated in FIG. 4A may be used to determine whether the scenario is LOS or NLOS. In the embodiment of FIG. 4A, the UE generates, at 405, a PDP (or a channel impulse response (CIR)), and the UE determines, at 410, whether the first peak (which may also be referred to as the "first detected path") is highest. If it is not, the UE determines, at 415, that the first detected path is an NLOS path; if it is, the UE determines, at 420, whether the rise time of the first detected path is sharp or gradual. If it is gradual, then the UE determines, at 415, that the first detected path is an NLOS path. If it is sharp, then the UE determines, at 425, that the first detected path is a LOS path.

The first detected path may be identified, for example, by (i) filtering the PDP with a moving sum filter using window of a first width, finding the maximum value of the moving sum, and then selecting (as the first detected path) the maximum value from the (unfiltered) PDP within another (second) window having a second width. Specifically, the moving sum is calculated by using the second moving window from the maximum value of the first window in the forward direction. If the moving sum is larger than a pre-calculated threshold, the tap corresponding to PDP as detected as first arrival path. The second width may be equal to the first width.

As mentioned above, positioning accuracy may be significantly degraded due to the impact of multipath caused by NLOS signals, which is especially true for Indoor Internet of Things (IIoT) scenarios. To address this issue, the UE may implement LOS/NLOS detection algorithms to classify each link to a TRP as an NLOS link or a LOS link, and then report the classification results to the location server. With the LOS/NLOS information, the location server may be able to choose a suitable positioning method to achieve the accuracy requirements.

In some embodiments, in addition to reporting the measurements of RSRP, RSTD, and Rx-Tx time difference, the UE may report, to the location server, a LOS/NLOS indicator corresponding to each received PRS signal. Each reported LOS/NLOS indicator may be either a hard decision (e.g., a binary value, selected from a set of two values, e.g., from the values zero and one) or a soft decision (e.g., a floating point or real value, or an integer from a range of integers (e.g., 0-255), or another value selected from a set of three or more values). A soft decision may be an estimate of the likelihood that the UE received the PRS via a line-of-sight path. The hard decision indicator may rely on the LOS/NLOS detection being performed by the UE, and may require less complexity at the LMF. However, the soft decision may provide higher accuracy for positioning performance. One example of LOS/NLOS indicator with soft decision is that the UE provides the likelihood of its having preformed NLOS detection, i.e., the probability of the first detected path being LOS, or the probability of the first detected path being NLOS. In this case, the reported LOS/NLOS indicators can be a certain set of discrete values between 0 and 1, e.g., values from the set $\{0, 0.1, 0.2 \ldots 0.9, 1\}$.

The LOS/NLOS indicators may be associated with the PRS resources or the PRS measurements. Specifically, the LOS/NLOS indicator values may change for different PRS identifiers (IDs) and different measurement times (e.g., time stamps). Each TRP may transmit PRS signals from time to time. Each such transmission may be referred to as a "PRS signal" which can also be represented as a "PRS resource" in the time-frequency domain.

Figure 4B:
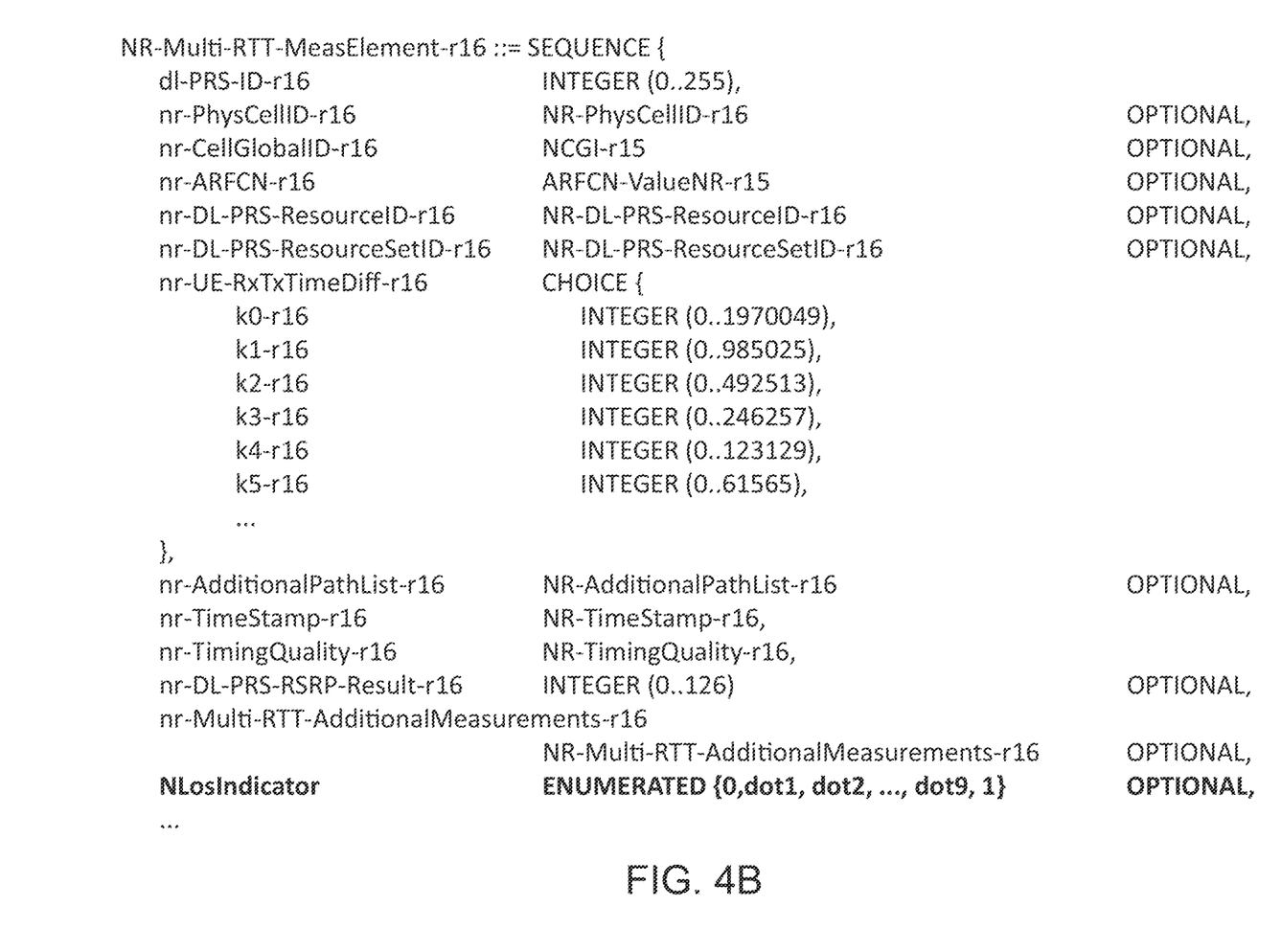
FIG. 4B is a format table, according to an embodiment of the present disclosure.

In Rel-16 NR positioning, UE-reported measurements are associated with each positioning method. For example, for a multi-RTT method, the UE may need to report the RSRP and Rx-Tx time difference measurements to the location server. The information element (IE) NR-Multi-RTT-SignalMeasurementInformation is used by the target device (e.g., the UE) to provide NR Multi-RTT measurements to the location server, as specified in 3GPP TS 37.355. For example, a new information element (IE) may be added into the IE NR-Multi-RTT-MeasElement in the IE NR-Multi-RTT-SignalMeasurementInformation to configure the LOS/NLOS indicator reported from the UE, which is shown in the table of FIG. 4B. The LOS/NLOS indicator can take any value between zero and one. For other positioning methods, such as DL-TDOA, DL-AoD, the LOS/NLOS indicator can be configured in the same way in the IE SignalMeasurementInformation.

In Rel-16 NR positioning, each PRS resource ID is associated with a single beam transmitted from a single TRP. For different Tx/Rx beams, the LOS/NLOS condition may be different. Furthermore, due to the mobility of the UE, even the PRS resources with the same ID but received at different time slots may have different LOS/NLOS channel conditions. Therefore, it may be desirable to design the LOS/NLOS indicator in the PRS resource level instead of the PRS resource set level or other higher levels.

The reporting of LOS/NLOS indictors is subject to the UE capability (i.e., some UEs may not be able to generate a LOS/NLOS indicator due to the complexity and energy consumption). Furthermore, even if a UE has the capability to generate a LOS/NLOS indicator, the indicator may be incorrect depending on the channel conditions. Therefore, the UE may first indicate to the network whether it has the capability to perform the LOS/NLOS detection. Such a capability indicator may be included in the UE capability reporting.

The network may configure the UE to report multiple measurements corresponding to multiple multipath components (or "paths") to increase the positioning accuracy. For example, the UE may measure and report multiple RSTDs and/or Rx-Tx time differences and/or path PRS-RSRPs (i.e., the PRS RSRP corresponding to a path at some specific delay) corresponding to different paths at different delays around the detected first arrival path, or "first detected path". In some embodiments, the UE reports, for each of a plurality of other paths not including the first detected path, the arrival time difference relative to the arrival time of the first detected path (where each arrival time difference relative to the arrival time of the first detected path is the difference between (i) the arrival time of the other path and (ii) the arrival time of the first detected path). The exact number of reports for RSTDs/Rx-Tx time differences/path PRS-RSRPs can be configured by the network.

More specifically, the UE may report, to the LMF, measurements corresponding to N additional time-domain paths (where N is greater than or equal to 2), e.g., three or more paths in addition to the first detected path. As used herein, a "path" corresponds to a tap in CIR/PDP for the PRS reception. These additional paths may be around the first detected path according to certain criteria. Specifically, the additional paths may be sorted according to (i) the delay/time of arrival (relative to the first detected path) or (ii) the power of each additional path (either as an absolute value, as a value relative to the first detected path, or as a value relative to the RSRP (the total power across all of the paths)).

"Around" the first detected path means close to the first detected path in terms of power and/or arrival time. For example, if the UE is configured to report measurements for N+1 paths including the first detected path, the N additional paths in the reporting can be sorted as (i) the paths having power within a threshold of that for the first detected path, and (ii) the N paths with the largest power. As another example of additional paths that may be considered to be around the first detected path in arrival time, the UE may be configured to report measurements for N paths in addition to the first detected path, the N additional paths being N consecutive paths immediately after the first path in the time of arrival. The measurements reported for the additional paths may be used by the LMF for position estimation in downlink positioning methods, uplink positioning methods, or downlink plus uplink positioning methods. Once the location server receives multiple measurement reports for multiple paths from one or multiple TRPs, it may process these measurements (e.g., using a suitable algorithm) to improve the positioning accuracy.

In a Downlink Angle of Departure (DL-AoD) positioning method as specified in Rel-16, the UE position may be estimated based on DL PRS RSRP measurements taken at the UE of downlink radio signals from multiple transmissions and from multiple TRPs, along with knowledge of the geographical coordinates of the TRPs and their relative downlink timing. The UE can use CSI-RS or PRS for the RSRP measurements. Once the RSRP has been reported from the UE, some example embodiments may utilize a suitable method to estimate the DL-AoD. For example, some example embodiments may use an algorithm relying on fingerprinting or a similar estimation algorithm to determine the DL-AoD based on RSRP reports across multiple beams received from the same TRP at the UE.

Under NLOS conditions this method may exhibit poor performance, because, e.g., the beam direction with maximum RSRP may be different from the beam direction for the LOS path between the TRP and the UE. If the location server estimates the UE's location using the beam direction corresponding to NLOS path, this may result in non-negligible positioning error. Thus it is desirable for UE to the report the RSRP measurement corresponding to the LOS path, when reception via the LOS path is available, in the DL-AoD method, and to report whether the measurement was made for the LOS path. For this purpose, if the UE is capable of detecting LOS/NLOS, the UE may measure the RSRP corresponding to the first arrival path and perform LOS/NOS detection, and report the RSRP measurement and LOS/NLOS information to the location server.

Figure 5:
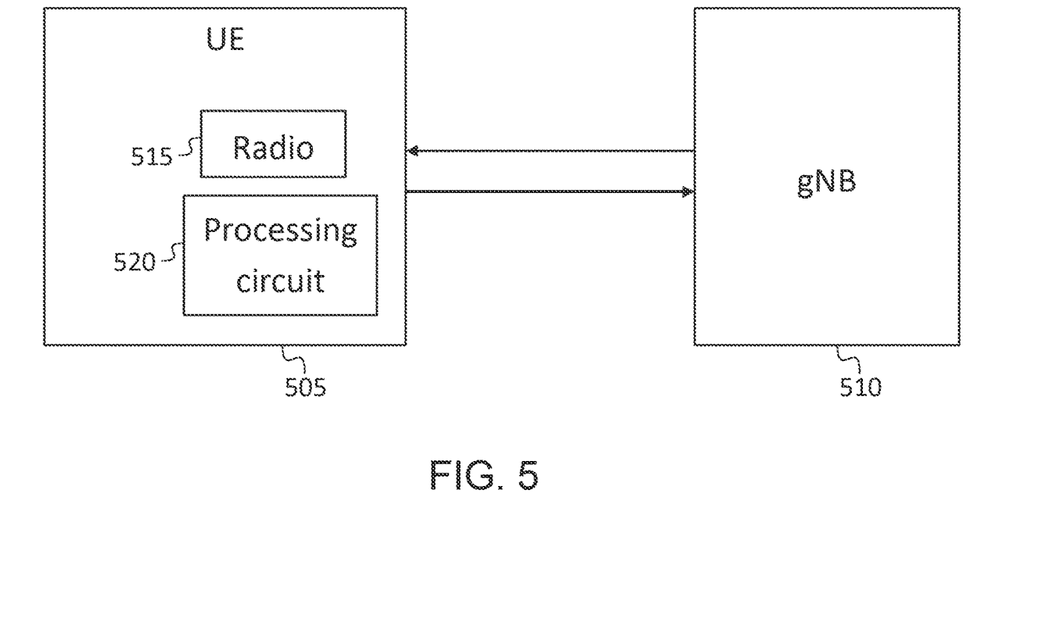
FIG. 5 is a block diagram of a portion of a mobile communications system, according to an embodiment of the present disclosure.
Figure 6:
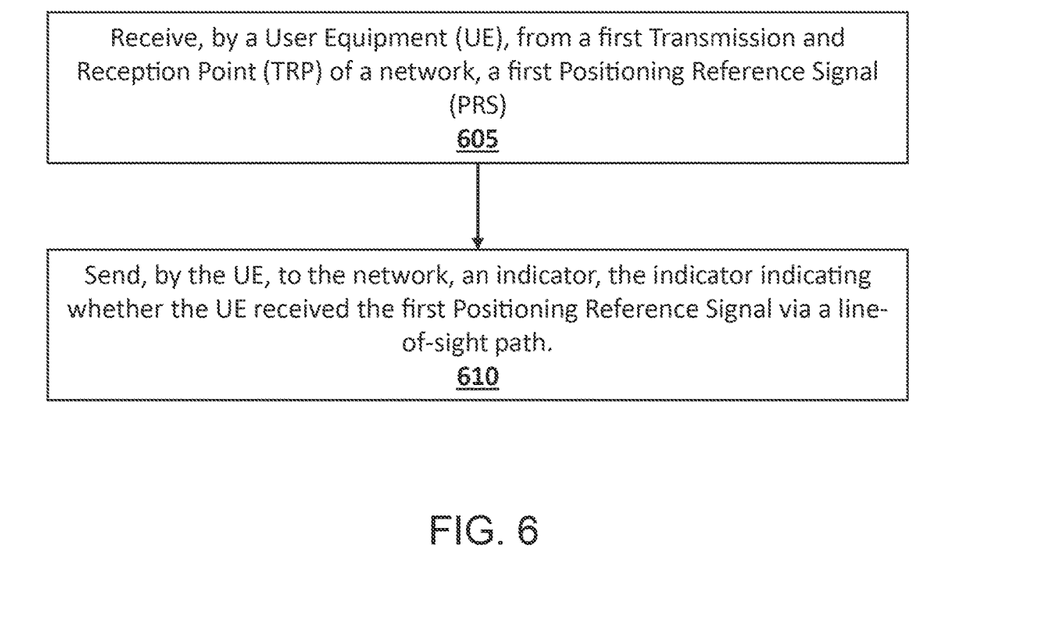
FIG. 6 is a flowchart of a method, according to an embodiment of the present disclosure.

FIG. 5 shows a system including a UE 505 and a gNB 510, in communication with each other. The UE may include a radio 515 and a processing circuit (or a means for processing) 520, which may perform various methods disclosed herein, e.g., the method illustrated in FIG. 6. For example, the processing circuit 520 may receive, via the radio 515, transmissions from the network node (gNB) 510, and the processing circuit 520 may transmit, via the radio 515, signals to the gNB 510. FIG. 6 shows a flowchart of a method, in some embodiments, at 605, a UE receives, from a first Transmission and Reception Point (TRP) of a network, a first Positioning Reference Signal (PRS), and, at 610, the UE may send, to the network, an indicator, the indicator indicating whether the UE received the first Positioning Reference Signal via a line-of-sight path.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. As mentioned above, a processing circuit, or means for processing, in a UE, may perform methods described herein, e.g., by transmitting signals (through a radio of the UE) or by receiving signals (through the radio of the UE), and, in some instances, by performing further processing.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for positioning capable of adapting to line-of-sight and non-line-of sight environments have been specifically described and illustrated herein, many modifications and variations will be apparent to those skilled in the art. Accordingly, it is to be understood that a system and method for positioning capable of adapting to line-of-sight and non-line-of sight environments constructed according to principles of this disclosure may be embodied other than as specifically described herein. The invention is also defined in the following claims, and equivalents thereof.

What is claimed is:

1. A method, comprising:
   receiving, by a User Equipment (UE), from a first Transmission and Reception Point (TRP) of a network, a Positioning Reference Signal (PRS); and
   sending, by the UE, a response to the network,
   wherein:
   the sending of the response comprises identifying, by the UE, a first detected path of the PRS and sending, by the UE, a plurality of measurements to the network, the plurality of measurements including, for each of a first plurality of paths corresponding to multiple multipath components of the PRS, an arrival time difference relative to the arrival time of the first detected path of the PRS, the first plurality of paths not including the first detected path, and the first plurality of paths comprising two paths.

2. The method of claim 1, further comprises sending, by the UE, to the network, an indicator, the indicator indicating whether the UE has performed a measurement based on a second Positioning Reference Signal, received via a line-of-sight path.

3. The method of claim 2, wherein the indicator is a binary value.

4. The method of claim 2, wherein the indicator is a value selected from a set of three or more finite precision values in the interval [0, 1].

5. The method of claim 4, wherein the indicator is an estimate of the likelihood that the UE has performed a measurement based on the second Positioning Reference Signal, received via a line-of-sight path.

6. The method of claim 2, further comprising:
   calculating, by the UE, a Power Delay Profile (PDP) or Channel Impulse Response (CIR) corresponding to the second Positioning Reference Signal; and
   generating, by the UE, the indicator, based on the Power Delay Profile or Channel Impulse Response.

7. The method of claim 2, wherein the sending of the indicator comprises sending the indicator in SignalMeasurementInformation information element (IE) for PRS-RSRP, RSTD, and Rx-Tx time difference measurements.

8. The method of claim 1, wherein the first plurality of paths comprises three paths.

9. The method of claim 1, wherein the plurality of measurements further includes, for each path of the first plurality of paths, the received power for the path.

10. The method of claim 9, wherein, for each path of the first plurality of paths, the received power for the path is a measurement of power for the path relative to a measurement of power for the first detected path.

11. The method of claim 9, wherein, for each path of the first plurality of paths, the received power for the path is a measurement of power for the path relative to a measurement of total power across all paths.

12. A system, comprising:
   a User Equipment (UE) comprising a processing circuit, the processing circuit being configured to:
   receive, from a first Transmission and Reception Point (TRP) of a network, a Positioning Reference Signal (PRS); and
   send a response to the network,
   wherein:
   the sending of the response comprises identifying, by the UE, a first detected path of the PRS and sending, by the UE, a plurality of measurements to the network, the plurality of measurements including, for each of a first plurality of paths corresponding to multiple multipath components of the PRS, an arrival time difference relative to the arrival time of the first detected path of the PRS, the first plurality of paths not including the first detected path, and the first plurality of paths comprising two paths.

13. The system of claim 12, wherein the processing circuit is further configured to send, by the UE, to the network, an indicator, the indicator indicating whether the UE has performed a measurement based on a second Positioning Reference Signal, received via a line-of-sight path.

14. The system of claim 13, wherein the indicator is a binary value.

15. The system of claim 13, wherein the indicator is a value selected from a set of three or more finite precision values in the interval [0, 1].

16. The system of claim 15, wherein the indicator is an estimate of the likelihood that the UE has performed a measurement based on the second Positioning Reference Signal, received via a line-of-sight path.

17. The system of claim 13, wherein the processing circuit is further configured to:
 calculate a Power Delay Profile (PDP) or Channel Impulse Response (CIR) corresponding to the second Positioning Reference Signal; and
 generate the indicator, based on the Power Delay Profile or Channel Impulse Response.

18. The system of claim 13, wherein the sending of the indicator comprises sending the indicator in SignalMeasurementInformation information element (IE) for PRS-RSRP, RSTD, and Rx-Tx time difference measurements.

19. A system, comprising:
 a User Equipment (UE) comprising means for processing, the means for processing being configured to:
  receive, from a first Transmission and Reception Point (TRP) of a network, a Positioning Reference Signal (PRS); and
  send a response to the network,
 wherein:
  the sending of the response comprises identifying, by the UE, a first detected path of the PRS and sending, by the UE, a plurality of measurements to the network, the plurality of measurements including, for each of a first plurality of paths corresponding to multiple multipath components of the PRS, an arrival time difference relative to the arrival time of the first detected path of the PRS, the first plurality of paths not including the first detected path, and the first plurality of paths comprising two paths.

\* \* \* \* \*